United States Patent [19]

Leung et al.

[11] Patent Number: 5,423,185
[45] Date of Patent: Jun. 13, 1995

[54] HIGH EFFICIENCY REFLECTIVE OPTICAL SYSTEM

[75] Inventors: Eddie M. Leung, San Diego; David D. Madura, La Jolla, both of Calif.

[73] Assignee: General Dynamics Corporation, San Diego, Calif.

[21] Appl. No.: 87,829

[22] Filed: Jul. 6, 1993

[51] Int. Cl.$^6$ .............................................. F25B 19/00
[52] U.S. Cl. ..................................... 62/51.1; 62/383; 505/888
[58] Field of Search .................. 62/51.1, 383; 505/888

[56] References Cited

U.S. PATENT DOCUMENTS

| | | | |
|---|---|---|---|
| 3,302,703 | 2/1967 | Kelly | 62/383 |
| 3,444,307 | 5/1969 | Kafka | 62/259.2 |
| 4,869,068 | 9/1989 | Van Vloten | 62/383 |
| 4,995,236 | 2/1991 | Rouquier et al. | 62/51.1 |
| 4,995,700 | 2/1991 | Barney et al. | 62/51.1 |

*Primary Examiner*—Ronald C. Capossela
*Attorney, Agent, or Firm*—John R. Duncan; Frank D. Gilliam

[57] ABSTRACT

Highly efficient reflective optical system that perfectly reflects incident electromagnetic radiation of a certain spectra and almost perfectly reflects radiation of another spectra. Incident electromagnetic radiation having a wavelength above a critical wavelength is relatively perfectly reflected. The critical wavelength is determined by the critical temperature of a high temperature superconductor material incorporated in the optical system. A preferred embodiment includes a cryogenically cooled substrate to which is applied a coating of a noble metal such as silver. A layer of a high temperature superconductor material is applied over the coating of noble metal. Since the critical wavelength of the incident radiation is inversely proportional to the critical temperature of the superconducting material, the use of high temperature superconductor material in the optical system provides a critical wavelength whereby certain spectra of an incident radiation is perfectly reflected. Since the effective emissivity of the optical system is very low for the same reason, the radiation heat transfer to cold objects (colder than the critical temperature of the superconductor) can be substantially decreased. Applications for such highly reflective optical systems provide for reducing radiation heat transfer for the tanks containing cryogens in space vehicles, for internal radiation shields for cryogenic dewars, as radiation insulation for lunar or orbiting space stations, to produce a thermal radiation shield for superconducting magnet systems, and as components in special purpose optical systems.

17 Claims, 1 Drawing Sheet

HIGH EFFICIENCY REFLECTIVE OPTICAL SYSTEM

BACKGROUND OF THE INVENTION

The present invention relates to an improved electromagnetic radiation reflective system and more particularly, but not by way of limitation, to high efficiency reflective optical systems using a high temperature superconductor to reflect perfectly a certain spectra of incident radiation.

All cryogenic applications require low heat transfer rates to minimize cryogens lost from boiloff due to heat transfer between the cryogens and the surrounding environment. When shielding systems at very low temperatures, heat leak due to radiative heat transfer is substantial. An improved radiation shield is needed to shield a very low temperature body, as in a cryogenic application, from a warmer source which also may be at a very low temperature.

Reflective optical systems utilizing superconductor materials have been known in the past. Such systems have been limited to perfect reflectance of electromagnetic radiation having a spectra of a fairly long wavelength. In addition, to be able to function at all required that the superconducting material be cooled to liquid helium temperatures. Obviously, in order to cool the superconducting material to such a low temperature required a cryocooler having substantial capacity and the cost of achieving such low temperatures did not make such systems attractive for widespread use. Thus, a need continued to exist for a cost effective high efficiency reflective optical system that provides perfect reflectance for electromagnetic radiation having a lower wavelength than had been possible with past systems.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates a cost effective high efficiency reflective optical system for perfectly reflecting electromagnetic radiation having greater than a predetermined wavelength that is incident upon a surface. The optical system includes a substrate such as strontium titanium oxide ($SrTiO_4$), silver, nickel, or other suitable metal surfaces. A noble metal coating such as silver or gold is applied to the substrate. A layer of superconducting material having a predetermined critical temperature that is preferably above a temperature that is generally considered to be a high temperature for such materials. An example of such a material is yttrium barium copper oxide (YBCO) which has a critical temperature of 92 K. Other high temperature superconductor materials would be Bismuth based compounds which have a critical temperature of 105 K. and Thallium based compounds that have a critical temperature of 125 K.

A suitable cryocooler lowers the temperature of the substrate and applied layers to a predetermined critical temperature. Preferably, the cooling head of the cryocooler is in conduction contact with the inner surface of the substrate. Thus, by lowering the temperature of the substrate and applied layers to a predetermined critical temperature for the superconducting surface material electromagnetic radiation having a predetermined wavelength and incident upon the optical system will be perfectly reflected. The use of the high temperature superconductor material for the outer surface of the optical system permits electromagnetic radiation having a lower critical wavelength to be perfectly reflected. The critical wavelength is determined on a basis wherein such wavelength in inversely proportional to the critical temperature of the superconductor material of the optical system.

Thus, with the optical system of the present invention more of the radiation incident upon the optical system will be perfectly reflected because it has a wavelength that exceeds a critical wavelength determined by the system. Because the effective emissivity of the surface of such optical system is very low due to this same effect the radiation heat transfer to cold objects (colder than the critical temperature of the superconductor material) can be substantially decreased thereby increasing the application of the optical system.

Obvious applications of the optical systems of the present invention are thermal radiation shields for superconducting magnet systems, internal radiation shields for cryogenic dewars, as insulation for space vehicles using cryogens to reduce boiloff, as radiation insulation for lunar or orbiting stations, and as components in special purpose optical systems used in lasers.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiments may be readily utilized as basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWING

For a fuller understanding of the nature and objects of the invention, reference should be had to the following detailed description taken in conjunction with the accompanying drawing in which.

DETAILED DESCRIPTION OF THE INVENTION

Figure 1:
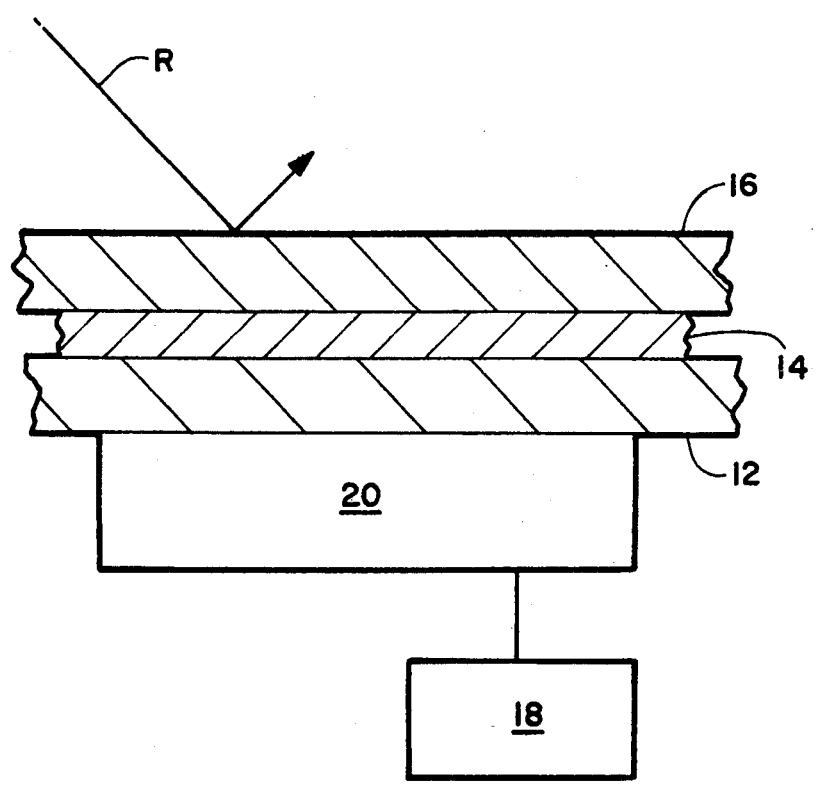
FIG. 1 is a simplified schematic of a high efficiency reflective optical system constructed in accordance with a preferred embodiment of the invention.

Referring now to the drawing in detail and in particular to FIG. 1, reference character 10 refers to a cost effective high efficiency reflecting optical system constructed in accordance with a preferred embodiment of the present invention. The optical system 10 includes a suitable substrate 12 having inner and outer surfaces. The substrate 12 is preferably composed of a material such as strontium titanium oxide ($SrTiO_4$), silver, nickel and other suitable metals. A coating 14 of a noble metal such as silver or gold is applied to the substrate in any suitable well known manner. The coating for an exemplary application would be about 0.5 to 1 mm thick.

A layer 16 of a suitable high temperature superconductor material is then applied to the coating 14. For purposes of the present invention, a high temperature superconductor is considered to be one which has a critical temperature, that is the temperature that the material transitions to a superconducting state, which exceeds 70 K. An example of such a material is yttrium barium copper oxide (YBCO) which has a critical temperature of 92 K. Other suitable high temperature superconductor materials would be Bismuth base compounds having a critical temperature of 105 K., eg. Bismuth Calcium Strontium Copper Oxide (BiCaSrCuO) and Thallium based compounds having a critical temperatures of 125 K.

The thickness of the layer 16 depends upon the particular application of the optical system 10 and the process selected to apply the high temperature superconductor coating to the coating 14. For thin films of the layer 16, the thickness would be on the order of 100's of nm. For thick films of the layer 16 the thickness would be on the order of 10's $\mu$m. In any event the preferred method is chosen on the basis of being cost effective and being effective in terms of generating the best possible surface in that there are no cracks, minimum grain boundary and so forth.

A number of different methods are available to apply the coating 14 and the layer 16 to the substrate 12. For example the thin film vapor deposition which is commonly used to fabricate solar cells, the thick film method pioneered by the Argonne National Laboratory and the electrodeposition method developed by the National Renewable Energy Laboratory (NREL). A suitable cryocooler 18 having a cooling head 20 that is positioned in contact with the inner surface of the substrate 12 provides for continuous cooling of the substrate 12 to a predetermined critical temperature and in turn the applied later 14 and coating 16. Cryocoolers are presently available with a capacity of 100 W at 80 K. and 10 W at 20 K. In terms of present day 1993 dollars, such cryocoolers may be purchased at a cost of around $15,000.

Electromagnetic radiation R that is incident upon the highly reflective optical system 10 is then reflected as seen in FIG. 1.

Figure 2:
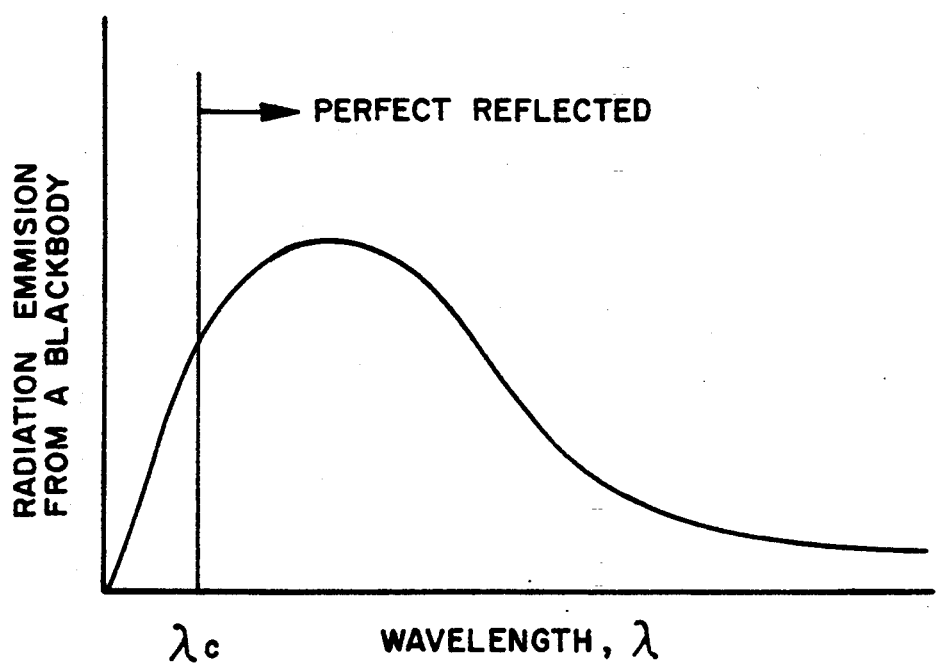
FIG. 2 is a graph illustrating the radiation emissivity and reflectivity for the optical system in response to the wavelength of electromagnetic radiation incident upon the optical system.

Referring now as well to FIG. 2, it will be seen that a blackbody spectral distribution is illustrated. For electromagnetic radiation having a wavelength longer than a critical wavelength, such electromagnetic radiation R in the spectra exceeding such critical wavelength will be perfectly reflected by the optical system 10. The critical wavelength for the optical system 10 is determined by the expression $\lambda c = hc/3.5 \, k \, tc$. In such expression h is Planck's constant ($6.626 \times 10^{-34}$ Js), c is the speed of light ($3 \times 10^8$ m/s), k is the Boltzmann constant ($1.381 \times 10^{-23}$ J/K) and $T_c$ it the critical temperature of the superconductor material 16. After substituting in the constants, the expression becomes $\lambda c = (4.112 \times 10^{-3}$ meter) $T_c^{-1}$.

In the instance of $Nb_3Sn$, a low temperature superconductor having a Tc = 18.3 K., perfect reflectivity of over half the irradiating power occurs when exposed to surfaces of temperatures less that about 15 K. For the optical system 10 of the present invention which utilizes high temperature superconductors having a critical temperature of 92 K. or higher, the critical wavelength of the optical system is materially increased.

Since the incident radiation is assumed to follow a blackbody spectral distribution as noted, it will be seen that the radiation R incident upon the optical system 10 which has a spectra having a wavelength less than that of the critical wavelength and will not be perfectly reflected but will be about 90% reflected. However, the optical system 10 having a high temperature superconductor layer 16 will reflect more of the radiation perfectly to yield an effective increase in average reflectivity.

As is seen in FIG. 2, because the effective emissivity of the surface of the optical system 10 is very low due to this same effect, the radiation heat transfer to cold objects (colder than the critical temperature of the superconductor: can be substantially decreased.

Thus, the optical system 10 may be used for a substantial number of applications. For example, the system 10 may be used for a thermal radiation shield for superconducting magnet systems) internal radiation shields for cryogenic dewars, as insulation for cryogenic tanks for space vehicles to reduce boiloff of the contained cryogens, for radiation insulation for lunar or orbiting stations, and as components in special purpose optical systems using lasers.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A reflective optical system for reflecting electromagnetic radiation incident upon a surface, which comprises:
   a substrate;
   a noble metal coating applied to said substrate;
   a layer of superconductor material applied to the coating, said superconductor material having a predetermined critical temperature, and
   means to maintain the substrate and applied coating and layer of superconductor material at a temperature below the critical temperature of the superconductor material whereby a certain spectra of electromagnetic radiation incident upon said reflective system and having a wavelength that is greater than a predetermined wavelength is perfectly reflected and the emissivity of the system is reduced for such wavelengths.

2. The optical system defined in claim 1 wherein the noble metal comprising the coating is silver.

3. The optical system defined in claim 1 wherein the noble metal coating is gold.

4. The optical system defined in claim 1 wherein the superconductor material comprising said layer having a critical temperature that is greater than a predetermined temperature permits said reflective optical system to provide substantially perfect reflectance for a spectra of electromagnetic radiation having a wavelength greater than a predetermined wavelength.

5. The optical system of claim 4 wherein the critical temperature of said superconductor material is high than about 70 K.

6. The optical system of claim 5 wherein said superconductor material is yttrium barium copper Oxide.

7. The optical system of claim 5 wherein said superconductor material is Bismuth Calcium Strontium Copper Oxide.

8. The optical system of claim 5 wherein said superconductor material is Thallium based copper oxide superconductor.

9. The optical system of claim 1 wherein the temperature of the substrate is maintained at a predetermined cryogenic temperature by a cryogenic cooler means.

10. The optical system of claim 9 wherein a cooling head of a cryogenic cooler means maintains the temperature of the substrate at a predetermined cryogenic temperature by maintaining conduction contact therewith.

11. The optical system of claim 1 wherein a thin film of the superconductor material having a thickness no greater than about 1 $\mu$m is applied to said coating.

12. The optical system of claim 11 wherein the layer of superconductor material is deposited upon the noble metal coating by a vapor deposition method.

13. The optical system of claim 1 wherein a thick film of the superconductor material having a thickness about 10 $\mu$m.

14. The optical system of claim 13 wherein the layer of superconductor material is deposited up the noble metal coating by an electrodeposition method.

15. The optical system of claim 1 wherein the substrate comprises strontium titanium oxide.

16. The optical system of claim 1 wherein the substrate comprises silver.

17. The optical system of claim 1 wherein the substrate comprises nickel.

* * * * *